(12) United States Patent
Drovdahl et al.

(10) Patent No.: US 8,925,042 B2
(45) Date of Patent: Dec. 30, 2014

(54) CONNECTING DEVICES TO AN EXISTING SECURE WIRELESS NETWORK

(75) Inventors: Mark Drovdahl, Seattle, WA (US);
Paulo Chow, North Bend, WA (US);
Sinclair M. Temple, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 434 days.

(21) Appl. No.: 13/096,981

(22) Filed: Apr. 28, 2011

(65) Prior Publication Data

US 2011/0296501 A1 Dec. 1, 2011

Related U.S. Application Data

(60) Provisional application No. 61/330,088, filed on Apr. 30, 2010.

(51) Int. Cl.
*H04L 29/06* (2006.01)
*H04W 12/08* (2009.01)
*H04W 84/12* (2009.01)
*H04W 48/08* (2009.01)
*H04W 88/06* (2009.01)

(52) U.S. Cl.
CPC .............. *H04W 12/08* (2013.01); *H04W 84/12* (2013.01); *H04W 48/08* (2013.01); *H04L 63/18* (2013.01); *H04W 88/06* (2013.01)
USPC .................... 726/4; 713/1; 713/150; 713/151; 713/163; 709/220; 709/225; 709/227; 709/228; 709/229

(58) Field of Classification Search
CPC ....... H04L 63/18; H04W 12/08; H04W 88/06
USPC ............................................................. 726/4
See application file for complete search history.

(56) References Cited

U.S. PATENT DOCUMENTS

| 2004/0068653 A1* | 4/2004 | Fascenda ...................... 713/168 |
| 2004/0181602 A1* | 9/2004 | Fink ............................. 709/229 |
| 2004/0200895 A1 | 10/2004 | Boyce et al. |
| 2004/0239498 A1 | 12/2004 | Miller |
| 2005/0021776 A1 | 1/2005 | Skwarek et al. |
| 2005/0090225 A1 | 4/2005 | Muehleisen et al. |
| 2005/0149757 A1* | 7/2005 | Corbett et al. ................ 713/201 |
| 2006/0039340 A1* | 2/2006 | Ptasinski et al. .............. 370/338 |

(Continued)

OTHER PUBLICATIONS

Lindqvist et al., Privacy-Preserving 802.11 Access-Point Discovery, Mar. 2009, Proceedings of the second ACM conference on Wireless network security, WiSec '09, pp. 123-130.*

(Continued)

*Primary Examiner* — Mohammad L Rahman
*Assistant Examiner* — Kenneth Chang
(74) *Attorney, Agent, or Firm* — Lee & Hayes, PLLC (57) ABSTRACT

An intermediary device may be used to connect a telecommunications device to an existing secure network that is accessed by a computing device. The intermediary device may simplify connections to the secure network by connecting to the secure network without setting up a new connection to the secure network. The telecommunications device may connect to the computing device, via the intermediary device, using a secondary network, which enables the telecommunications device to access the secure network through the computing device. In some instances, the computing device may operate to bridge a connection with the telecommunications device and perform some or all of the functions of the intermediary device.

9 Claims, 5 Drawing Sheets

(56) References Cited

U.S. PATENT DOCUMENTS

| | | | |
|---|---|---|---|
| 2006/0039563 A1* | 2/2006 | Carter et al. | 380/270 |
| 2006/0068799 A1* | 3/2006 | Morton et al. | 455/450 |
| 2006/0084411 A1 | 4/2006 | Lo et al. | |
| 2006/0123454 A1 | 6/2006 | Popa | |
| 2006/0153122 A1* | 7/2006 | Hinman et al. | 370/328 |
| 2006/0168153 A1 | 7/2006 | Lin | |
| 2006/0168264 A1 | 7/2006 | Baba et al. | |
| 2006/0172736 A1* | 8/2006 | Nevo | 455/435.1 |
| 2006/0208088 A1* | 9/2006 | Sekiguchi | 235/472.02 |
| 2006/0227972 A1* | 10/2006 | Brok et al. | 380/270 |
| 2007/0050615 A1* | 3/2007 | Xu et al. | 713/151 |
| 2007/0106764 A1 | 5/2007 | Mansfield | |
| 2007/0147318 A1* | 6/2007 | Ross et al. | 370/338 |
| 2007/0206527 A1* | 9/2007 | Lo et al. | 370/328 |
| 2008/0076454 A1* | 3/2008 | Yeh | 455/466 |
| 2008/0220741 A1* | 9/2008 | Hung | 455/411 |
| 2010/0159898 A1 | 6/2010 | Krzyzanowski et al. | |
| 2010/0254355 A1 | 10/2010 | Abraham et al. | |
| 2011/0162060 A1* | 6/2011 | Vijayakumar et al. | 726/13 |

OTHER PUBLICATIONS

The PCT Search Report & Written Opinion mailed Nov. 29, 2011 for PCT Application No. PCT/US11/34494, 8 pages.

The PCT Search Report & Written Opinion mailed Nov. 25, 2011 for PCT Application No. PCT/US11/34505, 8 pages.

Non-Final Office Action for U.S. Appl. No. 13/097,003, mailed on Mar. 29, 2012, Mark Drovdahl et al., "Securely Establishing Presence on Telecommunication Devices", 15 pages.

* cited by examiner

CONNECTING DEVICES TO AN EXISTING SECURE WIRELESS NETWORK

CROSS REFERENCE TO RELATED PATENT APPLICATIONS

This patent application claims the benefit and priority to Provisional U.S. Patent Application No. 61/330,088, titled, "Connecting Devices to a Wi-Fi Network with Authentication and Authorization", filed on Apr. 30, 2010, to the same inventors herein, the entire disclosure of which is incorporated by reference herein.

BACKGROUND

Today, people use electronic devices during a continually increasing portion of their day or week. For example, people use mobile telephones to conduct business, personal computers to manage their finances, and media services to receive media for entertainment. Often, the services and functionality of multiple types of communication devices overlap. For example, a person may transmit electronic messages (email) via a mobile telephone, a personal computer, a gaming console, and so forth, when these devices are configured properly. Each of these devices may access unique accounts and/or share access to one or more of the same accounts. Often, people prefer to have access to various communications and data using multiple different devices, thus increasing convenience and accessibility of information.

In telecommunications, people have many choices when conducting voice calls. For example, voice calls may be made over wired telephone lines (i.e., fixed "land-line" calling), over mobile wireless networks (i.e., cellular networks, digital mobile telephone networks), and over the Internet (e.g., voice-over Internet protocol (VoIP), etc.). Some or all of these types of communications may be routed through public switched telephone networks (PSTN), which allow a person to be contacted via an associated address or telephone number.

Sometimes it can be difficult to setup and/or configure an electronic device to provide communications. For example, setting up a home network may be difficult for some users that have relatively little experience with networked computers. Simplification of these processes may be valued by a significant population.

DESCRIPTION OF DRAWINGS

Non-limiting and non-exhaustive examples are described with reference to the following figures. In the figures, the left-most digit(s) of a reference number identifies the figure in which the reference number first appears. The use of the same reference numbers in different figures indicates similar or identical items or features.

DETAILED DESCRIPTION

As discussed above, people often use multiple electronic devices, which may perform functionality that overlaps with one another. For example, a person may be able to perform a voice communication with a remotely located person via a mobile telephone call and/or a voice-over internet protocol (VoIP) call. The VoIP call may be performed on any electronic device that has connectivity to the Internet, such as a computer, a smart phone (internet enabled and/or Wi-Fi telephone), an internet appliance, a gaming console, a set top box, and so forth.

Sometimes an initial connection may be difficult to configure. For example, a user may wish to configure a Wi-Fi calling (handset) application running on a communication device to work with a secure network. The person may not have the skill or information available to configure the Wi-Fi calling application to access the secure network, such as by not knowing the credentials of the network (e.g., passwords, etc.), when connecting to a work environment where the network is managed by information technology (IT) staff, or for other reasons.

In such instance, an intermediary device may be used to connect a telecommunications device to an existing secure network that is accessed by a computing device. The intermediary device may simplify connections to the secure network by connecting to the secure network without setting up a new connection to the secure network. The telecommunications device may connect to the computing device, via the intermediary device, using a secondary network, which enables the telecommunications device to access the secure network through the computing device. In some instances, the computing device may operate to bridge a connection with the telecommunications device and perform some or all of the functions of the intermediary device.

The techniques, apparatus, and/or systems described herein may be implemented in a number of ways. Example implementations are provided below with reference to the following figures.

Illustrative Environment

Figure 1:
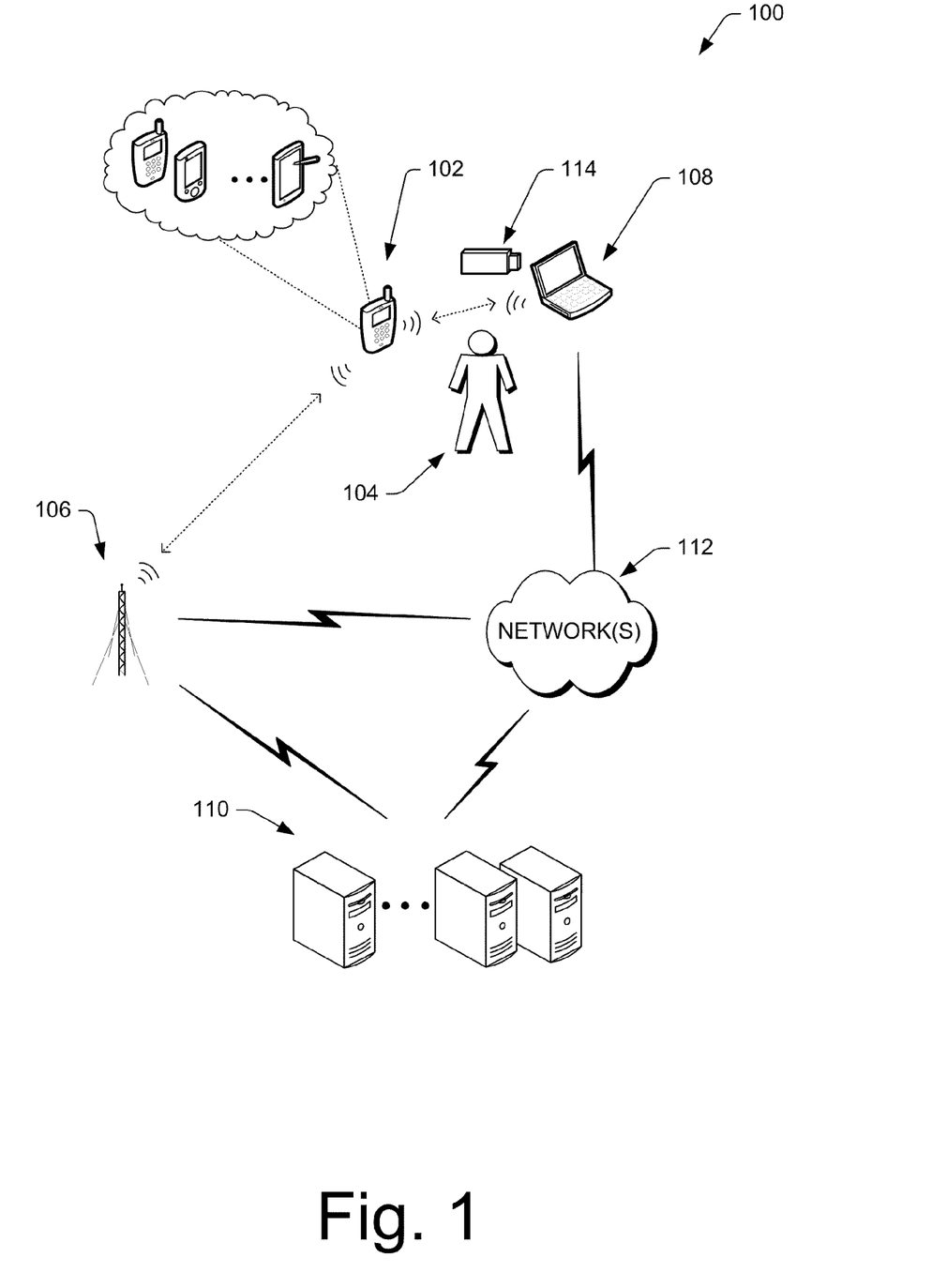
FIG. 1 is an illustrative environment showing Wi-Fi communications.

FIG. 1 is an illustrative environment 100 showing Wi-Fi communications in accordance with various embodiments of the disclosure. The environment 100 includes a telecommunications device 102. The telecommunications device 102 may be a mobile telephone, a smart phone, a netbook, a personal computer, a personal digital assistant (PDA), a tablet computer, a gaming console, or any other electronic device capable of enabling a user to perform voice, data, messaging, and/or Internet communications over a network. A user 104 may use the telecommunications device 102 to place and receive voice communications and/or transmit data, messages, and/or interact with the Internet. The voice communications may be mobile telephone calls routed through a mobile telephone networks 106 (e.g., 2G, 3G, other radio frequency (RF) wireless systems, etc.), Wi-Fi based calls, fixed land-line based calls, or other types of calls.

In some embodiments, the user 104 may employ a computing device 108 to assist (in whole or in part) with voice communications. The computing device 108 may be in communication with servers 110 via one or more network(s) 112. The network 112 may be a local area network (LAN), a wide area network (WAN), or other types of networks. Thus, the computing device 108 may exchange data, such as voice communication data, with the servers 110 to enable voice communications between the user 104 and other users. In addition, the telecommunications device 102 may connect to the servers 110 via the network(s) 112 to exchange data with the servers (e.g., perform voice communications, etc.). In some instances the telecommunications device 102 may communicate with the servers via Wi-Fi communications (via a local access point (AP)), via the mobile telephone network (e.g., 3rd Generation (3G) network, etc.) and so forth.

In accordance with embodiments, an intermediary device 114 may be used to connect the telecommunications device 102 to the network 112 via the computing device 108. The computing device 108 may have a secure or unsecure connection existing with the network 112. For example, when the computing device 108 is configured to access the network 112 by use of routers, etc., security passwords, firewalls, and other privacy and security infrastructure may be used to control traffic between the computing device and the network. In such instances, the user 104 may desire to connect to the network 112 using the telecommunications device 102 without configuring the network 112 and/or being tied to a wired network. For example, the user 104 may want to make voice calls using a Wi-Fi handset application on the telecommunications device 102 while roaming around her home, where the calls may be routed through the network 112 via the computing device 108. The telecommunications device 102 may communicate with the intermediary device 114 to facilitate communication with the computing device 108 and ultimately enable access to the network 112, regardless of whether the network connection is in a secured or an unsecured state. The intermediary device 114 may enable communications between the telecommunications device 102 and the computing device 108, such as by establishing a secondary local network to facilitate these communications and/or by assisting in creating a bridge network with the computing device. The bridge network may effectively be a type of secondary local network which links the telecommunications device to the computer without the intermediary device 114.

Illustrative Intermediary Device and Operation

Figure 2:
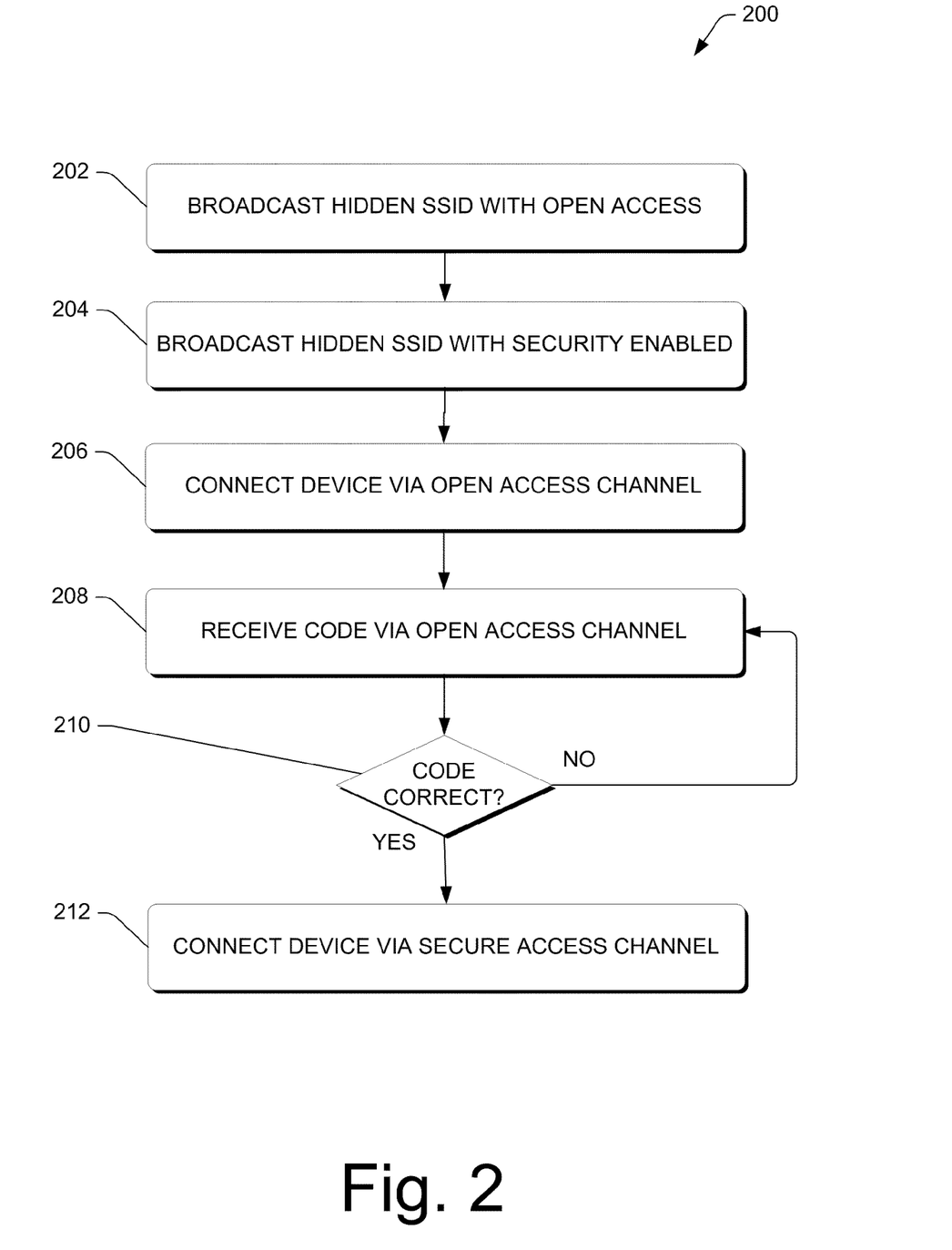
FIG. 2 is a flow diagram of an illustrative process of connecting to a secure network using an intermediary device.

FIG. 2 is a flow diagram of an illustrative process 200 of connecting to a secure network using an intermediary device. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

At 202, the intermediary device 114 may broadcast a hidden service set identifier (SSID) with open access (insecure), thus creating an open access SSID channel. The open access SSID channel may enable connection by a telecommunication device, such as the telecommunication device 102, via a Wi-Fi radio connection (or other wireless communication). Because the connection is open and hidden, it may be used by any device that knows, or discovers the name of the connection (e.g., address/identifier). The SSID may be known by (or communicated to) the telecommunications device 102, such as by a Wi-Fi calling application installed on the telecommunications device 102.

At 204, the intermediary device 114 may broadcast a hidden service set identifier (SSID) with security enabled, thus creating a secure access SSID channel. The secure access SSID channel requires a correct security code to enable use of the secure access SSID channel. In some embodiments, the SSID's of operations 202 and 204 may be created by the intermediary device 114, or in some instances, by the computing device 108. The secure access SSID channel may enable the telecommunications device 102 to connect to an existing network (e.g., the network 112, etc.) accessible via the computing device 108, such as a local access network (LAN), a wide access network (WAN), or another type of network. The network may enable the telecommunications device to perform Internet Protocol (IP) calling, such as using Voice over IP (VoIP).

At 206, the telecommunications device 102 may connect to the computing device 108 via an open access SSID channel that is established by the operation 202.

At 208, the intermediary device 114 and/or the computing device 108 may receive a code via the open access SSID channel. The code may enable connection to a secure access SSID channel that is established by the operation 204. The secure access SSID channel is inaccessible to devices that do not have access to the code.

The code may be provided via memory (printed text, computer-readable memory, etc.), such as by text printed on the intermediary device 114, instructions stored in flash memory in the intermediary device, downloadable instructions from a third party, printed instructions included with the intermediary device, and/or from other sources. For example, the intermediary device 114 may include the code printed on the device for easy entry by a user 104 via the open access SSID channel and a dialog box, possibly provided by a web server. The code may be made visible by the computing device 108 once the intermediary device 114 is plugged into (or otherwise communicates with) the computing device. In some embodiments, the code on the intermediary device may be a quick response (QR) code or other type of scannable code that can be scanned by the telecommunications device to transmit the code back to the server. In various embodiments, the code may be provided to the telecommunications device 102 via the mobile telephone networks 106 and then transmitted through the open access SSID channel. The code may be a temporary code, which may expire after use and/or after a predetermined amount of time. The code may also be transmitted to the computing device 108, and used for comparison against the code received from the telecommunication device 102.

At 210, the intermediary device and/or the computing device 108 may determine whether the code is correct. When the code is incorrect, the code may be resubmitted via the operation 208. When the code is correct at 212, the telecommunications device 102 may be connected to the network 112 via the secure access SSID channel. In some embodiments, the open access SSID channel may be disabled when the secured access channel is activated, or in use. In this way, other devices may be restricted from joining the secure access channel. For example, the intermediary device 114 may be configured to only broadcast the open access SSI channel or the secure access SSID channel rather than broadcasting both simultaneously. The telecommunications device 102 may then begin using the secure access SSID channel to communicate with the computing device 108.

In some embodiments, the operation 208 of receiving the code may be subsequent an event that causes the open access. For example, the event may allow open access to the open access channel for a predetermined amount of time. The event may be triggered by a physical control (depressing a button on the intermediary device) and/or by software based controls. In this way, the open access channel may be selectively available to enable connection of previously configured and/or yet to be configured telecommunications device(s), via the code, to the secure access channel.

In some embodiments, the open access SSID channel may be broadcast using a relatively weak signal strength that is only accessibly or capable of receipt by a device that is relatively close to the source of the signal, and thus less than a threshold distance from the source of the signal (e.g., a few feet away). The secure access SSID channel may be broadcast using a stronger signal strength that is capable of receipt at a distance greater than the threshold distance because the secure access SSID channel is secure and unauthorized use is not as much of a concern.

In accordance with some embodiments, a process to configure a Wi-Fi calling connection may be performed using the intermediary device 114 such as a USB device (or similar device). The user 104 may have an Internet-connected computing device (e.g., the computing device 108). The user may not have access to or knowledge of network settings of an available network (e.g., password, wireless network name, etc.). In some instances, the computing device 108 may not include wireless capabilities (e.g., a transceiver) to create a wireless network, but the computing device may be in communication with the network 112 via wired connections. The intermediary device 114 may enable wireless connectivity by the telecommunications device 102 to the wired network when configured as described herein with the computing device 108. A detailed example is provided next that discusses one illustrative way to connect the telecommunications device 102 to the computing device 108 in accordance with these parameters.

The user may download and install a Wi-Fi calling application to the telecommunications device 102. The user may insert a Wi-Fi universal serial bus (USB) device (i.e., the intermediary device 114) into a USB port in an internet connected computing device. A hidden SSID (service set identifier) with open access may be created by the intermediary device 114 as an open access SSID channel with a captive portal limiting access to an embedded web server (via a domain name system (DNS) redirect and an Internet Protocol (IP) firewall). In addition, a hidden SSID with security enabled (Wi-Fi Protected access (WPA/WPA2) or similar encryption schema) may be created and broadcast by the intermediary device 114 as a secure access SSID channel with access limited to predetermined server resources (via the IP firewall).

The user 104 may launch a Wi-Fi calling application on the telecommunications device 102. The application may locate the open access SSID channel that is hidden from other devices. The application may access an embedded web server that may prompt the user, via the application, for the code corresponding to the intermediary device 114. The embedded web server may confirm the code and send the application a WPA/WPA2 security password to access the secured access SSID channel.

The application finds the secure access SSID channel and associates using the WPA/WPA2 security password. The application now has network access while the intermediary device 114 is in communication with the computing device 108 that has access to the network 112.

In some embodiments, the intermediary device 114 may not include the open access SSID channel, and thus the operations 202 and 206 may not occur to establish connectivity of the telecommunications device 102 with the computing device 108 via the secure access SSID channel. In this implementation, the Wi-Fi calling application may prompt a user to enter the security code without having access to the network (s) 112 (without the open access SSID channel). Once the Wife calling application has a security code (such as by user input or extraction from the intermediate device 114), the telecommunications device 102 may attempt to access the secure access SSID channel.

Figure 3:
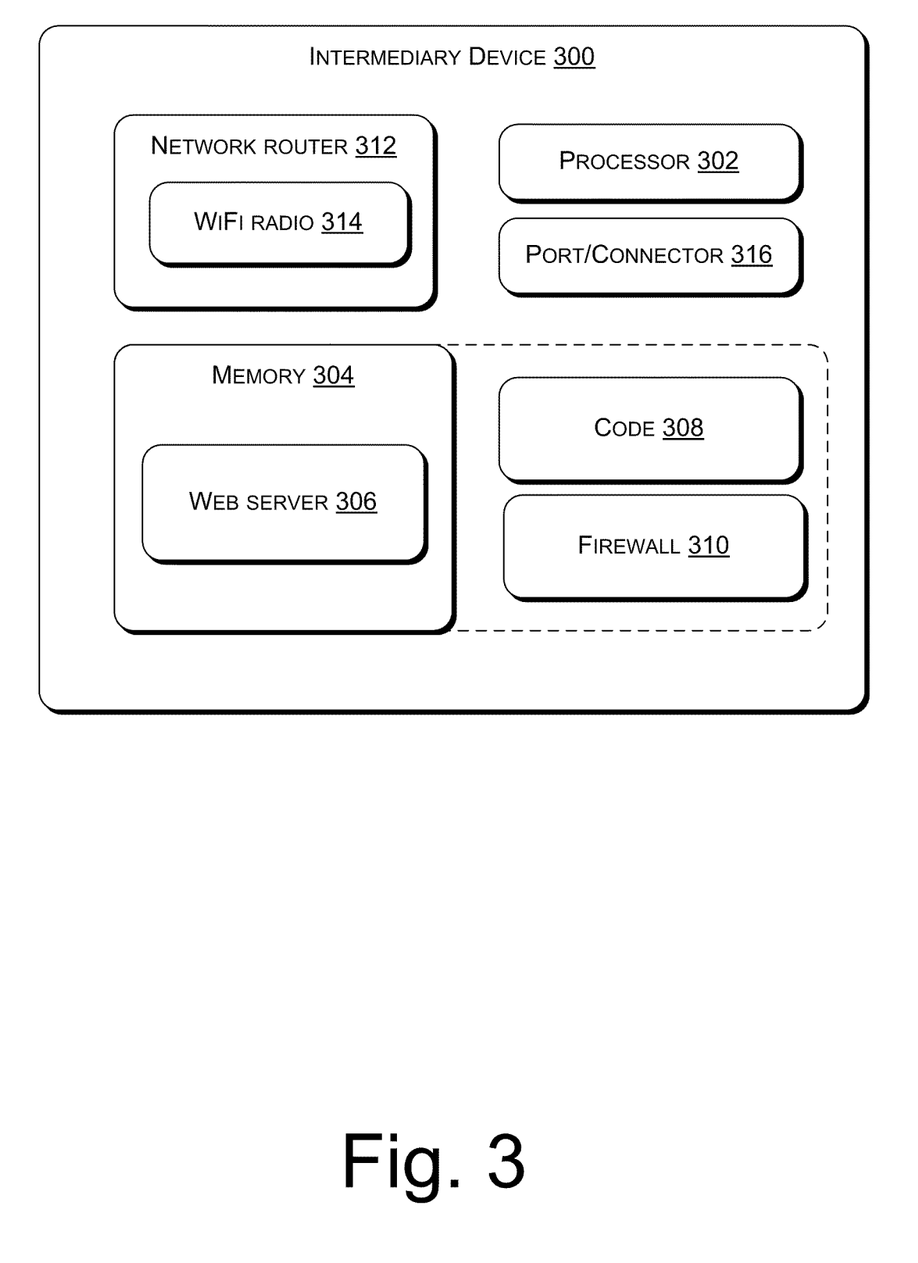
FIG. 3 is a block diagram of illustrative modules of the intermediary device to enable communication via a secure network.

FIG. 3 is a block diagram of an illustrative intermediary device 300 to enable communication via a secure network. The intermediary device 300 may be similar as the intermediary device 114 described with reference to FIG. 1.

In various embodiments, the intermediary device 300 may include a processor 302 and memory 304 having instructions executable by the processor. The memory 304 may store a web server 306 to interact with the telecommunications device 102, such as to receive the code at the operation 208 in the process 200. In various embodiments, the memory 304 may include a code 308. The code 308 may be used to verify the code from the operation 208 or be used in place of the code from the operation 208, and thus transmit the code to the server 110 without further input by the user 104. The memory 304 may also include a firewall 310. In some embodiments, the firewall may be implemented as hardware in the intermediary device 300.

However, in some embodiments, the intermediary device 300 may share processors and/or memory with a host, such as the computing device 108. For example, the intermediary device 300 may use the processors and memory of the computing device rather than having dedicated instances of processors and memory.

When the intermediary device 300 device is used to create a secondary network (the open and/or secure access SSID channel) by transmitting/receiving signals from the telecommunications device 102, the intermediary device 300 may include a network router 312 and/or a radio 314. The radio 314 may be implemented as a Wi-Fi radio, Bluetooth® radio, etc. In these embodiments, the intermediary device 300 may be a conduit for communications between the telecommunication device 102 and the computing device 108, which may employ one or more wireless networks to facilitate the communications. The intermediary device 300 may have access to an existing secure or unsecure network via the computing device 108 by way of a physical connection with the computing device (e.g., USB connection, etc.) as discussed next. In various embodiments, the intermediary device 300 may have Internet Protocol (IP) networking capabilities.

The intermediary device 300 may also include a port/connector 316 to connect to the computing device 108. The port/connector 316 may enable the intermediary device 300 to exchange data with the computing device 108, receive a power supply, and otherwise interact with the computing device. As discussed above, the code 308 may be included on the intermediary device 300 (such as printed on a label), or stored in memory for retrieval by the computing device 108, the user 104, or another entity.

When the intermediary device 300 is used as a bridge, the intermediary device may be used as a gateway for dissemination of the code 308. In some embodiments, the code 308 may be stored in the memory 304 and transmitted to the computing device 108 upon connection of the intermediary device with the computing device via the port/connector 316 (e.g., universal serial bus (USB) connection, etc.). The intermediary device 300 may also be implemented as a "dumb device" and simply contain the code made viewable to the user 104. In this implementation, the intermediary device 300 may be primarily a conduit to provide the code 308. For example, the intermediary device 300 may include a code written on a housing of the intermediary device. The code may be used to authenticate the telecommunications device 102 with the computing device that operates as a bridge, which is discussed in greater detail below.

When the intermediary device 300 is used as the bridge, the computing device 108 may exchange signals with the telecommunications device 102 to enable connectivity to the network 112. The intermediary device 300 may operate as a conduit to provide this operation, such as to provide the code for input by the user and/or via an electronic input via the computing device 108. The intermediary device 300 may operate as a physical token that may assist a configuration. For example, the user may download software onto the computing device 108. The physical token may be plugged into the computing device 108 or otherwise connected to or in communication with the computing device. The computing device 108 may then detect the physical token and perform operations to configure communication with the telecommunication device 102. The user 104 may input the code 308 into the telecommunication device (e.g., via a keypad, etc.), which may be transmitted to the computing device 108 via the bridge network for verification purposes. In these embodiments, the telecommunication device 102 may directly communicate with the computing device 108, which may employ one or more wireless networks to facilitate the communications. The intermediary device 300 may be used to configure this communication.

Illustrative Computing Devices

Figure 4:
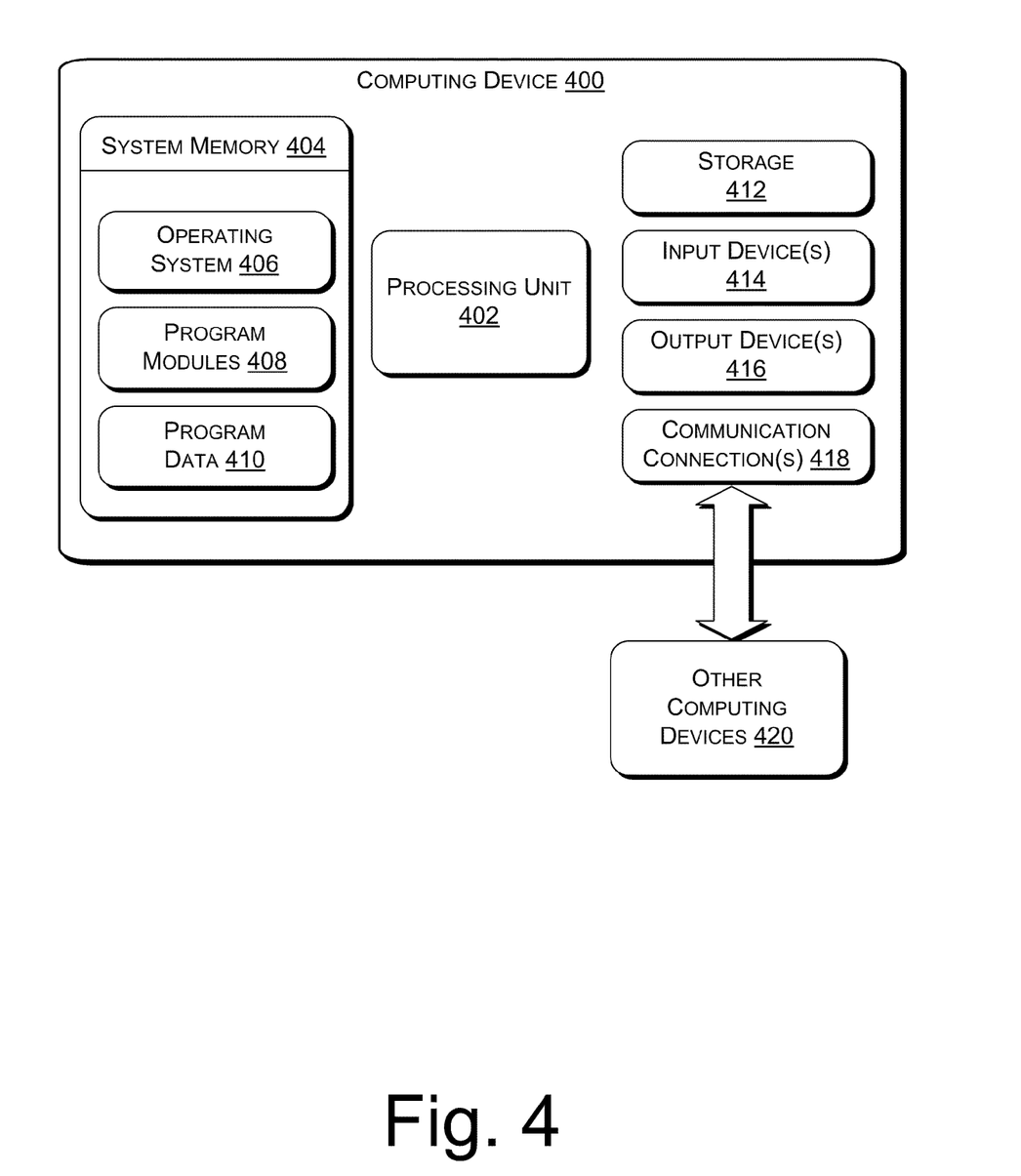
FIG. 4 is a block diagram of an illustrative computing device to enable communication via a secure network.

FIG. 4 is a block diagram of an illustrative computing device to enable communication via a secure network. In various embodiments, computing device 400 (such as the computing device 108) may include at least one processing unit 402 and system memory 404. Depending on the exact configuration and type of computing device, system memory 404 may be volatile (such as RAM), non-volatile (such as ROM, flash memory, etc.) or some combination of the two. System memory 404 may include an operating system 406, one or more program modules 408, and may include program data 410.

Computing device 400 may also include additional data storage devices (removable and/or non-removable) such as, for example, magnetic disks, optical disks, or tape. Such additional storage is illustrated in FIG. 4 by storage 412. Computer storage media may include volatile and nonvolatile, removable and non-removable media implemented in any method or technology for storage of information, such as computer readable instructions, data structures, program modules, or other data. System memory 404 and storage 412 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer-readable storage media may be part of device 400.

In various embodiment, any or all of system memory 404 and storage 412 may store programming instructions which, when executed, implement some or all of the above-described operations of the server 110 and/or the computing device 108.

Computing device 400 may also have input device(s) 414 such as a keyboard, a mouse, a touch-sensitive display, voice input device, etc. Output device(s) 416 such as a display, speakers, a printer, etc. may also be included. These devices are well known in the art and need not be discussed at length here.

Computing device 400 may also contain communication connections 418 that allow the device to communicate with other computing devices 420.

In some embodiments, some or all of the components described with reference to the intermediary device 300 shown in FIG. 3 may be included in the computing device 400 to enable the computing device to operate as the bridge. Thus, the computing device 400 may include the web server 306, the code 308, the firewall 310, or a combination thereof.

Figure 5:
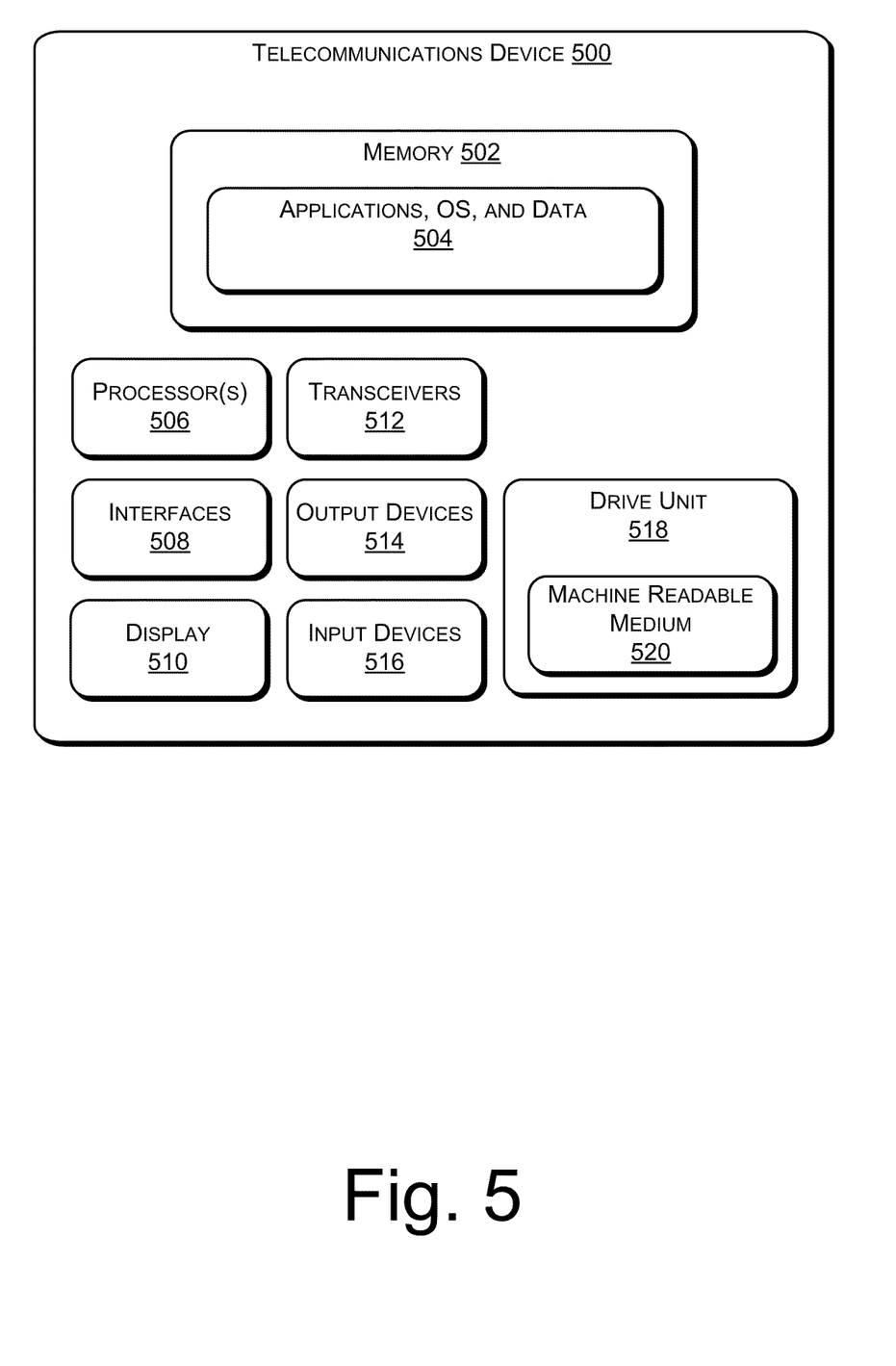
FIG. 5 is a block diagram of an illustrative telecommunications device.

FIG. 5 is a block diagram of an illustrative telecommunications device 500 in accordance with various embodiments. As shown, the telecommunications device 500 (such as the telecommunications device 102) may include a memory 502, the memory storing an application, OS, and data 504. The telecommunications device 500 further includes processor(s) 506, interfaces 508, a display 510, transceivers 512, output devices 514, input devices 516, and drive unit 518 including a machine readable medium 520.

In various embodiments, memory 502 generally includes both volatile memory and non-volatile memory (e.g., RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium). Additionally, in some embodiments, memory 502 includes a SIM (subscriber identity module) card, which is a removable memory card used to identify a user of the telecommunications device 500 to a service provider network. Memory 502 can also be described as computer storage media and may include volatile and nonvolatile, removable and non-removable media implemented in any method or technology for storage of information, such as computer readable instructions, data structures, program modules, or other data The applications, OS, and data 504 stored in memory 506 are also shown in FIG. 1 and described above in detail with reference to that figure.

In some embodiments, the processor(s) 506 is a central processing unit (CPU), a graphics processing unit (GPU), or both CPU and GPU, or other processing unit or component known in the art.

In various embodiments, the interfaces 508 are any sort of interfaces known in the art. Interfaces 508 include any one or more of an Ethernet interface, wireless local area network (LAN) interface, a near field interface, a DECT chipset, or an interface for an RJ-11 or RJ-45 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the telecommunications device 500 can use a Wi-Fi interface to communicate directly with a nearby device. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into telecommunications device 500.

In various embodiments, the display 510 is a liquid crystal display or any other type of display commonly used in telecommunication devices. For example, display 510 may be a touch-sensitive display screen, and can then also act as an input device or keypad, such as for providing a soft-key keyboard, navigation buttons, or the like.

In some embodiments, the transceivers 512 include any sort of transceivers known in the art. For example, transceivers 512 may include a radio transceiver and interface that performs the function of transmitting and receiving radio frequency communications via an antenna. The radio interface facilitates wireless connectivity between the telecommunications device 500 and various cell towers, base stations and/or access points.

In some embodiments, the output devices 514 include any sort of output devices known in the art, such as a display (already described as display 510), speakers, a vibrating mechanism, or a tactile feedback mechanism. Output devices 514 also include ports for one or more peripheral devices, such as headphones, peripheral speakers, or a peripheral display.

In various embodiments, input devices 516 include any sort of input devices known in the art. For example, input devices 516 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 520 stores one or more sets of instructions (e.g., software) embodying any one or more of the methodologies or functions described herein. The instructions may also reside, completely or at least partially, within the memory 502 and within the processor 506 during execution thereof by the telecommunications device 500. The memory 502 and the processor 506 also may constitute machine readable media 520.

Conclusion

Although structural features and/or methodological acts are described above, it is to be understood that the appended claims are not necessarily limited to those features or acts. Rather, the features and acts described above are disclosed as example forms of implementing the claims.

What is claimed is:

1. A method comprising:
broadcasting, by an intermediary device, an open access service set identifier (SSID) channel that is hidden and accessible without a password using a weak signal strength that is only accessible by devices that are less than a threshold distance from the intermediary device;
broadcasting, by the intermediary device, a secure access SSID channel that is inaccessible to unauthorized devices;
connecting, by the intermediary device, a device to the open access SSID channel, wherein the device is a telecommunications device;
receiving, by the intermediary device, a code from a computing device that is physically coupled to the intermediary device, wherein the computing device received the code from a telecommunication network;
receiving, by the intermediary device, the code from the telecommunications device using the open access SSID channel, the code to provide authorization to the telecommunications device to enable connection to the secure access SSID channel, wherein the telecommunications device received the code from a telecommunication network;
connecting, by the intermediary device, the telecommunications device to the secure access SSID channel; and
facilitating a Voice over Internet Protocol (VoIP) call from a Wi-Fi calling application executing on the telecommunications device via the secure access SSID channel.

2. The method as recited in claim 1, wherein the secure access SSID channel enables the device to access a secure network connection established by a computing device.

3. The method as recited in claim 2, wherein the secure network connection is at least one of a local area network (LAN) or a wide area network (WAN).

4. An apparatus, comprising:
a processor;
a radio to exchange signals with a device;
memory to store computer-readable instructions that, when executed, cause the processor to perform acts; and
a web server stored in the memory and executable by the processor to:
broadcast an open access service set identifier (SSID) channel that is hidden and accessible without a password using a weak signal strength that is only accessible by devices that are less than a threshold distance from the apparatus; and
broadcast a secure access SSID channel that is inaccessible to unauthorized devices, the secure access SSID channel to enable network connectivity between a device and an existing secure network,
wherein the web server uses the open access SSID channel to authorize the device and enable access to the secure access SSID channel, and
wherein web server receives a code transmitted over the open access SSID channel by the device and, based at least in part on the code, authorizes the device to access the secure access SSID channel,
wherein the apparatus is an intermediary device that is connected to a computing device through a universal serial bus (USB) connection, the computing device providing access to the existing secure network for the device when the device is authorized to access the secure access SSID channel and while the intermediary device is connected to the computing device through the USB connection,
wherein the device is a telecommunications device; and
the web server further facilitates a Voice over Internet Protocol (VoIP) call from a Wi-Fi calling application executing on the telecommunications device via the secure access SSID channel.

5. The apparatus as recited in claim 4, wherein the existing secure network is at least one of a local area network (LAN) or a wide area network (WAN).

6. The apparatus as recited in claim 4, wherein the memory further stores a firewall to prevent unauthorized access to the secure access SSID channel.

7. One or more computer-readable memory devices storing computer-executable instructions that, when executed on one or more processors of an intermediary device, performs acts comprising:
connecting a device to an open access service set identifier (SSID) channel that is hidden and accessible without a password using a weak signal strength that is only accessible by devices that are less than a threshold distance from the intermediary device, the open access SSID channel to provide local access between the device and the intermediary device;
receiving a code from a computing device that is physically coupled to the intermediary device, wherein the computing device received the code from a telecommunication network;

receiving the code from the device transmitted using the open access channel, the code to provide authorization to the device to enable connection to a secure access SSID channel, wherein the device is a telecommunications device that received the code from a telecommunication network;

connecting the telecommunications device to the secure access SSID channel to provide access between the telecommunications device and the intermediary device and, through the intermediary device, to an existing secure network connection of the computing device; and facilitating a Voice over Internet Protocol (VoIP) call from a Wi-Fi calling application executing on the telecommunications device via the secure access SSID channel.

8. The one or more computer-readable memory devices as recited in claim 7, wherein the existing secure network connection is at least one of a local area network (LAN) or a wide area network (WAN).

9. The one or more computer-readable memory devices as recited in claim 7, wherein the connecting the device to the open access SSID channel and the secure access SSID channel is performed using a Wi-Fi wireless protocol.

\* \* \* \* \*